Patented June 4, 1940

2,203,501

UNITED STATES PATENT OFFICE 2,203,501

ADHESIVE

Adolf Menger, Krefeld-Uerdingen, Germany, assignor, by mesne assignments, to Plaskon Company, Incorporated, Toledo, Ohio, a corporation of Delaware No Drawing. Application December 16, 1938, Serial No. 246,065. In Germany October 9, 1934

3 Claims. (Cl. 260—6)

The invention relates to improvements in the manufacture of adhesives.

The object of the present invention is the manufacture of an adhesive for gluing or cementing together various materials such as pasteboard, vulcanized fibre, textiles, and leather, and in particular for cementing wood.

An alkaline solution of the trilateral condensation product of (1) urea, (2) formaldehyde, and (3) a phenolate or naptholate has been suggested for use with blood as an adhesive, on the ground that such a trilateral condensation product does not precipitate albuminous bodies like other condensation products. Condensation products in general, such as formaldehyde-phenol and formaldehyde-urea products, have been thought to precipitate albuminous bodies or proteins from solution, and protective colloids have heretofore been used in the preparation of adhesives containing both a protein and a condensation product. These protective colloids have been used in order to prevent the protein and the condensation product from going into solution together.

The present invention relates to an adhesive containing a particular protein, i. e., blood albumen, and a particular condensation product, i. e., the bilateral condensation product of formaldehyde and urea. The only adhesives containing this condensation product and this protein that have been disclosed, as in the case of adhesives containing other condensation products and proteins, have been colloidal suspensions containing a protective colloid to prevent the condensation product and the protein from going into solution together.

The cementing of materials by means of blood or blood albumen is known. Such cementings, however, have a shearing strength that for many purposes is completely insufficient. A further disadvantage of such cementings resides in the fact that they are readily decomposed by micro-organisms, particularly after becoming damp.

An adhesive embodying the present invention comprises a hardener, and an aqueous solution of a bilateral urea-formaldehyde condensation product and blood or blood albumen. Such adhesives produce cementings having remarkably high shearing strengths, and stability against decomposition by micro-organisms.

Blood albumen and a bilateral formaldehyde-urea condensation product have not heretofore been used together in solution. An alkaline solution of the trilateral condensation product of urea, formaldehyde and a phenolate or naptholate has been disclosed to be suitable for use with blood albumen, but such trilateral condensation products have been said to differ from the bilateral condensation product of formaldehyde and urea in that they do not require a protective colloid when used with a protein to form an adhesive.

The properties of these trilateral condensation products are entirely different from the properties of the bilateral condensation product of urea and formaldehyde, and the use of such trilateral condensation products with blood albumen forms no part of the present invention. Although it has been disclosed that urea, formaldehyde and sodium cresolate form a trilateral condensation product in a molar ratio of 1:1:1, the product of the reaction of formaldehyde with urea and a relatively small molar proportion of a phenolate contains a considerable amount of the bilateral condensation product of formaldehyde and urea.

The shearing strength of the bond formed by the present adhesive does not merely lie between that of a bond containing blood albumen alone and that of a bond containing formaldehyde-urea resin alone, but is surprisingly high. It is thought that the high strength of the bond formed by the present adhesive is due to some interaction between the blood albumen and the condensation product in the adhesive solution. In fact, a shearing strength can be obtained by means of the present adhesive that is considerably higher than the strength of a bond consisting of either blood albumen alone or formaldehyde-urea resin alone.

An adhesive embodying the present invention may have any desired ratio of blood albumen to formaldehyde-urea condensation product. For example, an adhesive containing a small proportion of blood albumen and a large proportion of formaldehyde-urea condensation product forms a bond of higher shearing strength than an adhesive containing formaldehyde-urea condensation product without blood albumen. Of course a bond consisting of blood albumen alone has a lower shearing strength than a bond consisting of formaldehyde-urea resin alone. Thus the addition of a small proportion of formaldehyde-urea condensation product to a blood albumen solution might be expected to improve the shearing strength of the bond formed by the solution. However, when an adhesive embodying the invention is prepared by adding a small proportion of formaldehyde-urea condensation product to a blood albumen solution, the shearing strength of the bond is considerably greater than might be expected on the basis of the difference between the shearing strength of a blood albumen bond and the shearing strength of a formaldehyde-urea resin bond.

Suitable urea-formaldehyde condensation products are those used in adhesives, especially wood adhesives, obtainable from urea and formaldehyde or polymers thereof. The known aqueous solutions of condensation products such as can be obtained by the process described in U. S. Patent No. 2,019,834 are especially adapted for the purpose of this invention. Relatively small amounts of condensation products other than the bilateral condensation product of formaldehyde and urea may be used if desired in adhesives embodying the invention, because no material impairment of the valuable properties of the adhesives is thereby produced.

Suitable hardeners for the condensation products mentioned are acids, acid salts and substances which split off acids, such as hydrochloric acid, sulfuric acid, phosphoric acid, acetic acid, oxalic acid, lactic acid, acid sodium sulfate, mono-ammonium phosphate, aluminum chloride, ammonium chloride and ammonium sulfate.

For most purposes it is recommended that substances be added to the blood having a thickening effect thereon. Such substances are those containing a high molecular organic radical combined with a group promoting solubility in water, particularly the sulfonic acid group, such as alkali metal or ammonium sulfonates of polyalkylated hydrocarbons, for example the salts of diisopropyl napthalene sulfonic acid or dibutyl naphthalene sulfonic acid, or salts of sulfonated tar oils or of sulfonated fatty acids, such as wax acids, montanic acids and the like.

If required for special purposes, further additional substances can be incorporated with the adhesive, such as starch, potato flour, ground potato flakes or fillers of the most varied kinds.

The application of the adhesive is carried out by the usual methods of cementing or gluing by means of adhesives derived from urea-aldehyde condensation products. Thus the adhesive solution, after the addition of a hardening agent, is applied to the surfaces to be cemented, and the materials so prepared are then hot-pressed or pressed at ordinary temperatures. For some purposes it may be advantageous to carry out the cementing in accordance with the process of U. S. Patent No. 2,015,806, in which the adhesive solution and the hardening agent are applied separately to the surfaces to be cemented together.

Although any water-soluble bilateral condensation product of urea and formaldehyde may be employed, a suitable product may be prepared as follows:

200 parts by weight of a 30% aqueous solution of formaldehyde are heated to 95° C. with 0.1 part by weight of mono-sodium phosphate. A solution heated to 70° C. and consisting of 60 parts by weight of urea in 30 parts of water is then added. After the addition of 0.15 part by weight of tri-sodium phosphate the solution is evaporated in vacuo at a temperature below 50° C. until a 30% solution of the condensation product is obtained.

The present adhesive must be made or become acid before the formaldehyde-urea condensation product can set. However, when the adhesive solution is made sufficiently acid so that it sets within a reasonable time after application, the solution must be used up immediately after being prepared. Therefore, it is preferable to employ as the hardening agent a substance which gradually renders the solution acid. When ammonium chloride is used as the hardening agent in the adhesive solution, the solution is substantially neutral at first, but eventually becomes quite acid. It is believed that the free formaldehyde in the adhesive gradually combines with ammonia from the ammonium chloride so as to set hydrochloric acid free.

If desired, some aqueous ammonia solution may be added with the ammonium chloride. The purpose of this ammonia solution is simply to retard the action of the hardening agent. It is believed that the free formaldehyde in the solution combines with the free ammonia, and the addition of ammonia along with the ammonium chloride retards the acidification of the solution. Other retarding agents may be used if desired.

Adhesives of widely varying compositions embodying the invention may be prepared, ranging from adhesives containing a small proportion of blood albumen and a large proportion of formaldehyde-urea condensation product to adhesives containing a large proportion of blood albumen and a small proportion of formeldehyde-urea condensation product. The following example is given merely by way of illustration:

After the addition of 1.5 parts by weight of a hardener, consisting of a mixture of 10 parts by weight of ammonium chloride, 25 parts by weight of concentrated ammonia and 65 parts of water, to 10 parts by weight of the condensation product solution obtained as described above, 3 parts by weight of blood albumen and 7 parts of water are incorporated. This adhesive is applied to furniture wood, which is then pressed for some 12 minutes at a temperature of 90–100° C. under a pressure of about 3 atmospheres.

This patent application is in part a continuation of Menger application Serial No. 42,146, entitled "Adhesive," filed September 25, 1935.

I claim:

1. An adhesive comprising an acid-reacting hardening agent, and an aqueous solution containing a quantity of a bilateral formaldehyde-urea condensation product and up to an approximately equal quantity of blood albumen.

2. An adhesive comprising a quantity of a bilateral formaldehyde-urea condensation product, up to an approximately equal quantity of blood albumen, and ammonium chloride, all in aqueous solution.

3. An adhesive comprising an acid-reacting hardening agent, and an aqueous solution containing a quantity of a bilateral formaldehyde-urea condensation product, up to an approximately equal quantity of blood albumen and a thickening agent.

ADOLF MENGER.